May 21, 1957 E. G. CLARK 2,793,347

PHASE DETECTOR SYSTEMS

Filed Nov. 24, 1953 2 Sheets-Sheet 1

INVENTOR.
EDWARD G. CLARK
BY
[signature]
ATTORNEY

INVENTOR.
EDWARD G. CLARK
BY
Allen V. Hazeltine
ATTORNEY

United States Patent Office 2,793,347

Patented May 21, 1957

2,793,347

PHASE DETECTOR SYSTEMS

Edward G. Clark, Elkins Park, Pa., assignor to Philco Corporation, Philadelphia, Pa., a corporation of Pennsylvania Application November 24, 1953, Serial No. 394,021

13 Claims. (Cl. 324—89)

The present invention relates to electrical systems and more particularly to improved phase comparator circuits for producing an output signal having an amplitude and a polarity as determined by the amount and the sense of the phase difference between two signals having substantially the same carrier frequency. Such circuits are especially useful in color television systems for controlling the frequency and phase of an oscillator serving to provide a demodulation signal for the color subcarrier component of the received color video wave and the invention will be specifically described in such use. However, it should be well understood that the phase comparator circuits of the invention are also applicable to other systems in which a signal is required having amplitude and polarity variations as determined by the extent and sense of the departure of the phase of one carrier signal from a reference phase position established by a second carrier signal.

The video signal appearing at the detector of a color television receiver typically comprises horizontal and vertical synchronizing signals, a color video wave and a marker wave for providing a phase reference for the color-establishing component of the video wave. In practice, the horizontal and vertical synchronizing signals are in the form of time-spaced pulses recurrent respectively at the horizontal and vertical scanning frequencies of the image to be reproduced. The color video wave occurs during the intervals between the horizontal pulses and may comprise a brightness or monochrome component having a frequency spectrum extending, for example, from 0 to 3.5 mc./sec., and a color-establishing, or chromaticity, component in the form of a modulated subcarrier wave having a nominal frequency of approximately 3.58 mc./sec. The marker signal may be in the form of a burst of a small number of cycles of carrier signal having a frequency equal to the frequency of the chromaticity subcarrier component of the color video wave, and occurs during the so-called back porch interval of the horizontal scanning pulses, so that these bursts recur at a frequency equal to the horizontal line scanning frequency, i. e. at a frequency of 15.75 kc./sec.

The marker or burst signal, serving as a phase reference of the color subcarrier of the video wave, may be used for demodulating the subcarrier in any of several manners. Most generally, the burst signal is used to synchronize a demodulation signal oscillator operating at the subcarrier frequency. To achieve the desired synchronization, the burst signal and the demodulation signal are supplied to a phase comparator system which produces a control signal as determined by the difference between the phase of the carrier of the burst signal and the phase of the demodulation signal. The control signal so produced then serves to appropriately vary the frequency and phase of the oscillator.

Various forms of phase comparator systems have been proposed for the above-noted purpose. The form of phase comparator which has been most generally used so far, has been the so-called balanced phase detector consisting of a bridge, two arms of which are made up of diode elements. The so arranged diode elements are energized in phase opposition by one of the input signals and are energized in the same phase sense by the other of the input signals. The bridge is made to exhibit a cross-over or null position, when the input signals thereof are in phase quadrature, by accurately balancing the input voltages supplied to the diode elements so that each diode element is equally energized under this phase condition.

To achieve a balance of the input voltages supplied to the diode elements, it has been the practice to apply one of the input signals to the bridge by means of a center-tapped transformer or other form of phase-splitting device. It has been found that the stability of the phase detector, in maintaining the initially adjusted null position, is largely determined by the stability of the phase splitter and that changes in the characteristics of the phase splitter, due to temperature variations and/or aging of this component, change the null position of the detector and bring about a residual output signal notwithstanding the fact that the input signals may be exactly in phase quadrature.

A further disadvantage of the above-mentioned type of phase detector is its relatively low sensitivity so that, in order to obtain an output signal of sufficient amplitude to achieve the desired control of the synchronizing system of the oscillator, it is necessary to amplify the input signals to the detector to appropriately large values and/or to amplify the output signal of the phase detector. Since the input signals are generally high frequency signals, i. e. of the order of 3.58 mc./sec. for the systems herein specifically described, it is found that amplifiers, which are suitable for increasing the intensity of the input signals to the required amount without introducing undesirable phase shifts of the processed signals, are relatively costly and their use undesirably complicates the circuitry of the oscillator control system. Similarly, since the output signal of the phase comparator is essentially a D. C. signal, the use of drift free amplifiers having adequate low frequency response suitable for increasing the intensity of the output signal has been found to be costly and undesirable.

So-called unbalanced phase detectors are known which have a greater sensitivity than the balanced detectors above-described. Phase detectors of this type are characterized by the feature that both of the input signals may be applied thereto as single-ended inputs, thereby obviating the need for a balanced input signal. Detectors of this type, however, have poor stability due to the fact that the desired output signal is superimposed on a reference level signal component which is also generated by the phase detector. This reference level signal component undergoes serious changes in value with aging of the detector and upon changes of the supply voltages of the detector, and these changes correspondingly affect the absolute value of the desired output signal unless a compensating signal exactly cancelling the reference level signal component is injected into the output circuit of the phase detector.

It is an object of the invention to provide improved phase comparator circuits characterized by high stability and sensitivity.

Another object of the invention is to provide improved phase comparator circuits which are adapted to be supplied with unbalanced or single-ended input signals and which product a single-ended output signal having a null value which is stably fixed with respect to ground potential.

A specific object of the invention is to provide improved phase comparator circuits especially useful for synchronizing the color demodulation signal oscillator of a color television receiver with a synchronizing component of a received color television signal.

Further objects of the invention will appear as the specification progresses.

In accordance with the invention the foregoing objects are achieved by a phase comparator system comprising a demodulator adapted to produce a single component representing a multiplication product of two applied input carrier signals. It is a feature of the invention that one of the carrier signals to be multiplied has the form of a carrier wave which is amplitude modulated by a signal having an asymmetric waveform. Under this condition the demodulator is made to produce a product signal having a frequency equal to the frequency at which the said carrier wave is amplitude modulated and having an asymmetric waveform, the peak excursions of which have an amplitude and direction as determined by the amount and the sense of the departure of the phase of one of the input carrier signals relative to the phase of the other of the input carrier signals. The system of the invention further comprises means for selectively deriving the said product signal, to the exclusion of other multiplication products produced by the demodulator, and a bipolar detector system for converting the asymmetric product signal into a low frequency signal having an amplitude and polarity, with respect to ground potential, as determined by the amplitude and polarity of the peak excursions of the asymmetric signal. In a preferred embodiment of the invention, the foregoing objects are achieved by means of a phase comparator system comprising a dual grid product demodulator which is energized by a reference signal in the form of relatively short bursts of carrier of reference frequency and a second carrier signal, the phase of which is to be controlled. This preferred embodiment further comprises a bipolar detector system consisting of two diode elements operating as peak detectors. The diodes are A. C. coupled to the output of the product demodulator and are poled so as to be selectively conductive as determined by the polarity of the envelope excursions of the asymmetric product signal applied thereto.

The invention will be described in greater detail with reference to the appended drawing forming part of the specification and in which.

Figure 1:
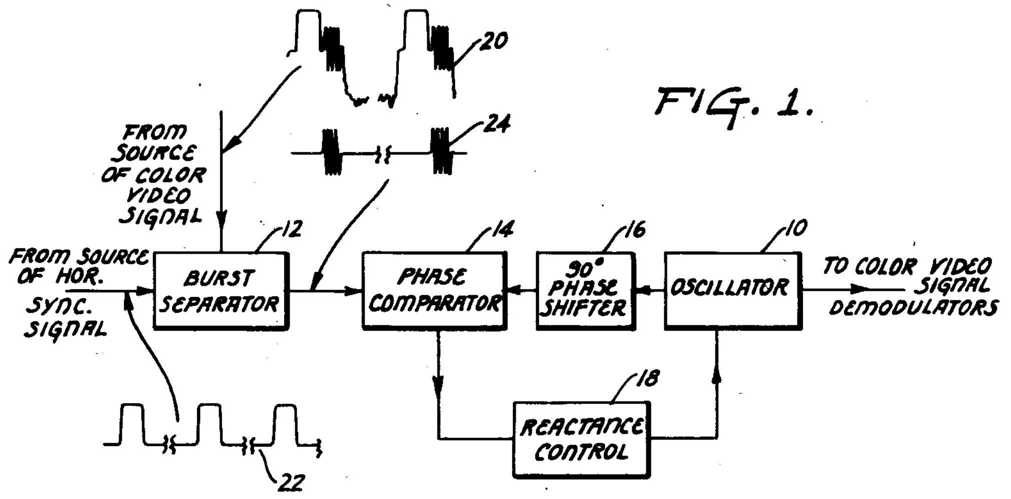
Figure 1 is a block diagram of a system for synchronizing a demodulation signal oscillator of a color television receiver by means of an incoming reference signal, in which type system the phase comparator of the invention is especially applicable.

Referring to Figure 1, the system there shown comprises an oscillator 10 adapted to generate a signal which, in a color television receiver, may serve as a demodulation signal for the chromaticity component of the received color television video wave. As previously pointed out, for demodulating the color subcarrier component of the received color video wave, the demodulation signal must be maintained in accurate phase synchronism with the color subcarrier component of the received color video wave, the demodulation signal must be maintained in accurate phase synchronism with the color subcarrier component. For this purpose the system of Figure 1 further comprises a burst separator 12, a phase comparator 14 having one input circuit thereof energized by the output from burst separator 12, a phase shifter 16 energized by the oscillator 10 and supplying a second input signal to the phase comparator 14, and a reactance control 18 which is energized by the output signal of the phase comparator 14 and which is coupled to the oscillator 10.

The oscillator 10 may be conventional in form and may comprise an electron discharge device having its input and output electrodes coupled together in regenerative feedback relationship by means of a resonant circuit nominally tuned to the desired operating frequency i. e. 3.58 mc./sec., the frequency of the subcarrier component of the received color video wave.

The burst separator 12 may consist of a dual grid thermionic tube having one control grid supplied with the received video signal shown at 20. The second control grid of the tube is negatively biased so as normally to prevent conduction through the tube. The tube is made conductive at the proper instants, i. e. during the back porch intervals of the horizontal synchronizing pulses, by means of positive-going pulses shown at 22 which are derived from the horizontal sync pulses and are delayed by an appropriate amount. The output circuit of the burst separator may include a tuned circuit broadly resonant to the carrier frequency of the desired burst signal, i. e. tuned to approximately 3.58 mc./sec., whereby undesired components generated by the gating action of the burst separator may be attenuated and an output signal having the form shown at 24 is produced by the burst separator. A particularly suitable form of such a burst separator 12 is described in detail in the copending application of Clem H. Phillips, Serial No. 345,307, filed March 30, 1953.

Suitable forms of the phase comparator 14 in accordance with the invention, and adapted to produce an output signal having an amplitude and polarity as determined by the extent and sense of the difference between the phase of the carrier of the burst signal 24 and the phase of the signal produced by oscillator 10, will be described hereinafter with specific reference to Figures 2 and 3.

The 90° phase shifter 16 may consist of a delay line of appropriate length or may consist of an inductance-capacitance resonant circuit tuned to 3.58 mc./sec. which, when energized by a signal from the oscillator 10, produces an output signal in phase quadrature to the input signal. In practice, the 90° phase shifted signal produced by the phase shifter 16 may be derived directly from the oscillator 10 by appropriate coupling to the signal circuit thereof. In this latter case, the use of a distinct phase shifter 16 becomes unnecessary.

The reactance control 18 may assume any one of the well known forms and may typically consist of a Miller-type reactance tube which is connected in shunt with the resonant circuit of the oscillator 10 and is thereby adapted to vary the frequency and/or phase of the oscillator as determined by the value of the control signal applied thereto from the phase comparator 14.

Figure 2:
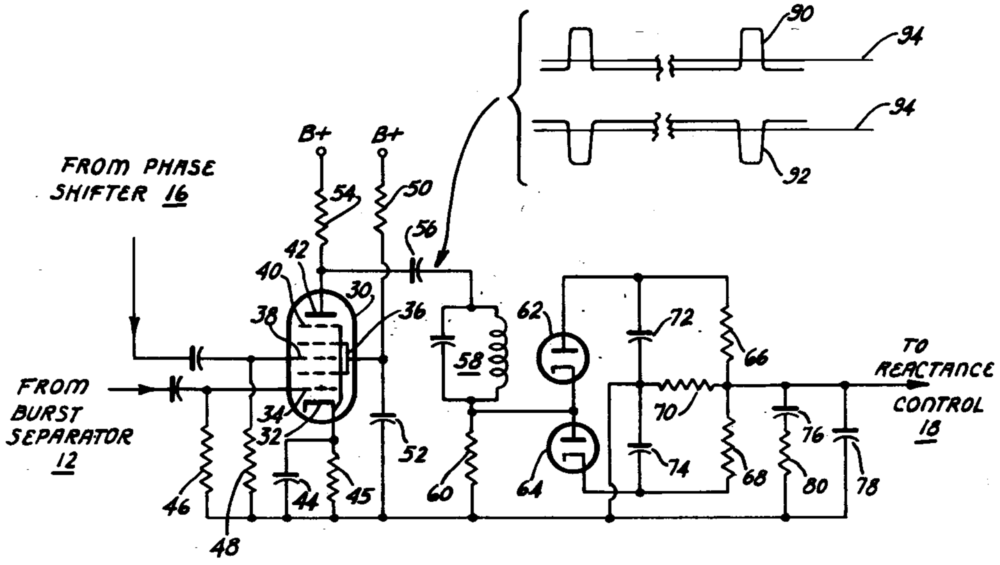
Figure 2 is a schematic diagram of one form of the phase comparator in accordance with the invention.

Referring now to Figure 2, which shows one form of phase comparator 14 in accordance with the invention, the phase comparator shown comprises a multigrid electron discharge tube 30 having a cathode 32, a first control grid 34, a screen grid 36, a second control grid 38, a suppressor grid 40 and an anode 42.

The cathode 32 is connected to a point at ground potential through a resistance capacitance circuit 44—45 serving to establish the operating bias voltage of the tube. The control grids 34 and 38 are provided with D. C. returns to ground potential by means of conventional grid resistors 46 and 48 respectively. The screen grid 36 is operated at a positive potential which is applied to the screen grid from a source B+ through an appropriate voltage dropping resistor 50, the screen grid being otherwise grounded for signals at the operating frequency by means of a by-pass capacitor 52. The suppressor grid 40 may be connected to the cathode as shown. The anode 42 of the tube is supplied with a positive potential from a source B+ through a load impedance 54 which may consist of a resistor as shown.

Connected to the anode 42 of tube 30 is a series network comprising a capacitor 56, an inductance-capacitance resonant circuit 58 and a resistor element 60. Connected to the junction of the resonant circuit 58 and the resistor 60 is a first series circuit made up of a diode 62, a resistor element 66 and a resistor element 70, and a second series circuit made up of a diode element 64, a resistor element 68 and the resistor element 70. Diodes 62 and 64 operate as peak detectors, this mode of operation being achieved in well known manner by selecting the values of resistors 66, 68 and 70 appropriately large. Connected across the diodes 62 and 64 are capacitors 72 and 74 which serve to bypass high frequency components of the signal at the outputs of the diodes.

The common junction of resistors 66, 68 and 70 serves as an output terminal of the phase comparator and may be additionally connected to a low pass filter made up of two capacitors 76 and 78 and a resistance element 80 as shown.

The operation of the phase comparator shown in Figure 2 may be explained as follows:

The multigrid tube 30, serving as a product demodulator, multiplies together the burst carrier signal supplied to the grid 34 thereof from the burst separator 12 and the carrier signal supplied to the grid 38 thereof from the phase shifter 16. As a result of the multiplying action in the tube 30, there is produced across the load impedance 54 a composite signal having a first component $E_1=K_1 \cos \phi$ and a second component $E_2=K_2 \cos (2\omega t+\phi)$, where $K_1$ and $K_2$ are constants as determined by the amplitudes of the input signals and by the transconductance characteristics of the tube 30, $\omega t$ is $2\pi$ times the carrier frequency of the input signals, and $\phi$ is the phase relationship between carrier components of the input signals. Also produced at the anode of tube 30 is a steady state D.-C. component signal, the value of which is determined by the characteristics of the tube 30 and by the operating potentials thereof. Additionally, and because of the imperfect shielding normally existing between the control grids 34 and 38 and the anode 42, there may be produced at anode 42 a signal component at the carrier frequency of the input signals.

It will be noted that, since the burst signal supplied to control grid 34 is effectively a carrier signal which is amplitude modulated by a pulsiform wave, the signal component $E_1=K_1 \cos \phi$ will similarly undergo changes in amplitude at the interruption frequency of the burst signal, i. e. at a frequency of 15.75 kc./sec. Furthermore, since the amplitude of the signal component $E_1$ is also a function of the value of cosine $\phi$, the amplitude excursions of the signal component $E_1$ will be determined by the difference between the phase angle of the burst carrier signal and the carrier signal from the phase shifter 16. As a result of the foregoing, the signal component $E_1$ at the anode 42 of tube 30 will have the form shown at 90 and 92 whereby, when the two input signals to the control grids 34 and 38 depart from phase quadrature in one direction, the signal $E_1$ has the form shown at 90 with the peak excursions of the amplitude thereof extending in a positive direction and having a value determined by the extent of the phase departure, and, when the two input signals depart from phase quadrature in opposite direction, the signal $E_1$ has the form shown at 92 with the peak excursions of the amplitude thereof extending in a negative direction and having a value determined by the extent of the phase departure. When the two input signals are exactly in phase quadrature, the term $\cos \phi$ becomes zero in value and the signal component $E_1$ also becomes zero.

From the foregoing it is seen that there is produced, at the anode of the product demodulator tube 30, a first signal component which is essentially a D.-C. signal and is produced by the steady state current flowing through the tube 30, a second signal component having a frequency equal to the repetition rate of the applied burst signal and having amplitude and polarity excursions as determined by the extent and sense of the phase difference of the two input carrier signals, and a third signal component having a frequency equal to twice the carrier frequency of the input signals.

By means of the D.-C. blocking capacitor 56, the signal $E_1=K_1 \cos \phi$, developed at the anode 42, is derived independently of the D.-C. signal component, so that the amplitude excursions thereof recur about a zero voltage reference level shown at 94. Since the diodes 62 and 64 are connected in opposite polarities to the junction of the resonant circuit 58 and the resistor 60 and operate as peak detectors, the diodes form a bipolar detector which produces, at the junction of resistors 66 and 68, a D.-C. potential determined by the peak value of the signal $E_1$. This D.-C. potential will have a positive polarity with respect to ground potential when the signal $E_1$ has the form shown at 90 or will have a negative polarity when the signal $E_1$ has the form shown at 92.

As previously pointed out, because of normally imperfect shielding between the input and output circuits of the tube 30, there may appear at the anode 42 a signal component at the frequency of the two input signals. This signal, which may be characterized by positive and negative modulation envelopes of different shapes, may be asymmetrically rectified by the diodes 62 and 64 and thereby produce an undesirable signal at the junction of resistors 66 and 68. The inductance-capacitance circuit 58, which is made resonant to the frequency of the input signals, serves as a trap attenuating this undesirable component signal at the output of tube 30.

The signal component $E_2=K_2 \cos (2\omega t+\phi)$, produced by the product demodulator tube 30, generally has symmetrical positive and negative modulation envelopes. Therefore, when this latter signal is applied to the diodes 62 and 64, it will produce equal currents through the diodes which cancel out at the junction from which the desired output signal is derived. In practice, because of the high frequency value of the signal $E_2$, this signal is substantially completely attenuated by the stray capacitance shunting the resistor 60 and brought about by the diodes 62 and 64 and the associated wiring, so that the effects of this signal need not be considered. In some instances, however, it may be desirable to insure that the signal $E_2$ is attenuated and this may be effected by shunting the resistor 60 with a bypass capacitor (not shown) having a low impedance at 7 mc./sec. and a high impedance at frequencies less than about 50 kc./sec., and/or by including a trap (not shown) in the series circuit between the anode 42 of tube 30 and the resistor 60. Such a trap may be similar to the trap 58 and is constructed to be resonant at the frequency of signal $E_2$.

Typical values for the components of the phase comparator of Figure 2 may be as follows:

| | |
|---|---|
| Tube **30** | type 6BA7. |
| Diodes **62** and **64** | type 6AL5. |
| Resistor **45** | 470ω. |
| Resistors **46** and **48** | 1500ω. |
| Resistor **50** | 1000ω. |
| Resistors **54** and **60** | 39,000ω. |
| Resistors **66** and **68** | 2.2 megohms. |
| Resistor **70** | 10 megohms. |
| Resistor **80** | 47,000. |
| Capacitors **44**, **52**, **56** | .01 mfd. |
| Capacitors **72**, **74** | 1000 mmfd. |
| Capacitor **76** | .47 mfd. |
| Capacitor **78** | 470 mmfd. |

Figure 3:
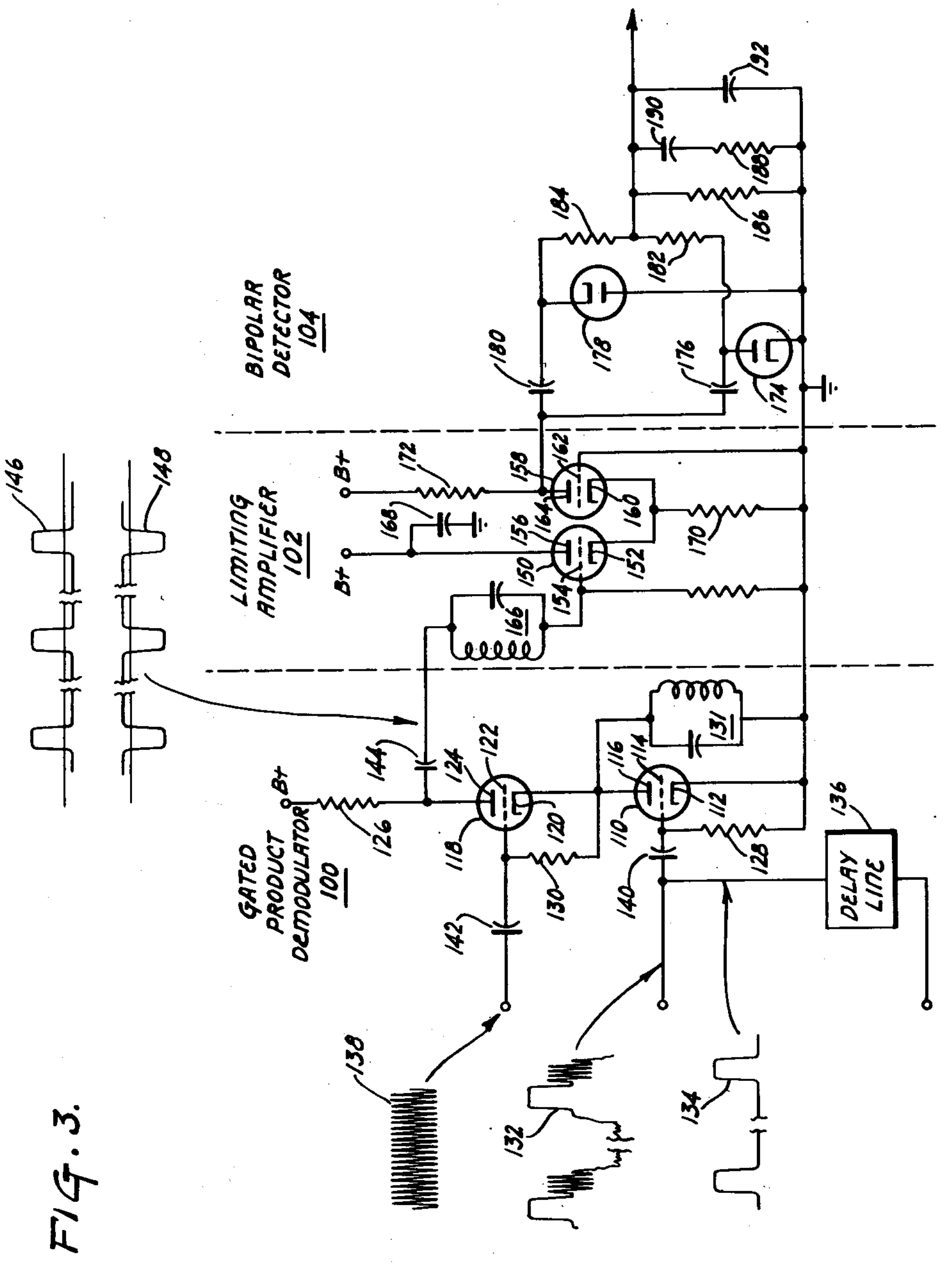
Figure 3 is a schematic diagram of another form of the phase comparator in accordance with the invention.

Figure 3 illustrates an embodiment of the invention which is more sensitive than the phase comparator shown in Figure 2 and in which the phase comparator system is made to serve the additional function of the burst separator shown in Figure 1. The system shown comprises a gated product demodulator 100 for producing a signal component having a frequency equal to the gating frequency of the product demodulator and having an amplitude $E_1=K_1 \cos \phi$, an amplifier system 102 serving to increase the sensitivity of the phase comparator system in the manner to be pointed out hereinafter, and a bipolar detector system 104 for producing an output signal having an amplitude and polarity as determined by the extent and the sense of the phase difference of the two input carrier signals to be compared.

The gated product demodulator 100 comprises a first tube section 110 having a cathode 112, a control grid 114 and an anode 116, and a second tube section 118 having a cathode 120, a control grid 122 and an anode 124. The cathode 120 is directly connected to the anode 116. The so connected tube sections are energized from a source of positive potential, shown as B+, which is connected to the anode 124 through a load impedance 126, shown as a resistor. The cathode 112 of tube section 110 is connected to ground potential. A D. C. return is provided for the grid 114 by a grid resistor 128, and a D. C. return for the grid 122 is provided by a grid resistor 130. An inductance-capacitance circuit 131 having a resonant frequency substantially equal to the carrier frequency of the input signals to be compared is provided in shunt with the tube section 110.

To produce the desired signal $E_1$ in the output circuit of the product demodulator, the control grid 114 is supplied with the received color video signal shown at 132 and with a pulsiform gating signal 134, these signals being applied to the grid 114 through a capacitor 140. The signal 134 may consist of the horizontal sync signal of the received video signal which is time delayed, by means of a delay line 136, by an appropriate amount so that the amplitude excursions thereof recur in synchronism with the occurrence of the burst signal component of the color video signal 132. The control grid 122 is supplied through a capacitor 142 with the other of the input carrier signals to be compared, shown at 138, which signal may be derived from the 90° phase shifter 16 of Figure 1.

The network formed by the resistance element 128 and capacitor 140 has a time constant which is sufficiently long, compared to the period between successive pulses of the signal 134, so that leveling upon the peaks of signal 134 is effected, and the tube section 110 is made conductive only during the intervals at which the signal 134 attains its peak values. During these conduction periods the anode-cathode current of the tube section 110, and of tube section 118, is modulated by the burst signal component of the video signal 132 and is further modulated by the signal 138 applied to the grid 122. The multiplying action thus effected produces the desired signal component $E_1=K_1 \cos \phi$ across the load impedance 126. It will be noted that, as in the case of the signal $E_1$ produced by the product demodulator of the system of Figure 2, the signal $E_1$ produced by the product demodulator of the system of Figure 3 has a repetition rate equal to the repetition rate of the burst signal component of the input video signal and has peak excursions, the amplitude and direction of which are determined by the extent and sense of the phase difference between the oscillator signal applied to control grid 122 and the burst carrier applied to control grid 114. By means of a D. C. blocking capacitor 144, the signal $E_1$ may be derived from the product demodulator free from the D. C. component produced by the demodulator. The so derived signal has the form shown at 146 when the carriers of the input signals to be compared differ in phase in one sense, and has the form shown at 148 when the carriers of input signals differ in phase in the opposite sense.

In order to enhance the sensitivity of the phase comparator, the signal $E_1$ is supplied to the amplifier 102. Amplifier 102 may be conventional in form and may consist of one or more amplifying stages adapted to increase the intensity of the signal $E_1$ to the maximum extent as determined by the available anode supply voltage for the amplifier tubes. Preferably the amplifier is a so-called limiting amplifier which serves to increase the rate of change of the amplitude of the signal $E_1$, at values thereof corresponding to small departures of the input carrier signals from phase quadrature, to an extent greater than normally determined by the available anode supply voltage for the amplifier tubes. The specific form of amplifier shown comprises a first triode tube section 150, having a cathode 152, a control grid 154 and an anode 156, and a second triode section 158 having a cathode 160, a control grid 162 and an anode 164. The signal $E_1$ from the capacitor 144 is supplied to the control grid 154 preferably through a resonant trap 166 which is tuned to the carrier frequency of the input signals to the phase comparator similar to the trap 58 shown in Figure 2. The anode 146 is supplied from the source B+ and is made to operate at zero signal potential by means of a by-pass capacitor 168 connected thereto. The load impedance of the tube section 150 is contained in its cathode circuit and is provided by a resistor 170. Cathode 160 is connected to the cathode 152 so that the resistor 170 is common to both cathodes and serves as the signal source for the tube 158. The control grid 162 is connected directly to ground potential and thereby operates at zero signal potential. The anode 164 is energized from the source shown as B+ through a load impedance 172 shown as a resistor.

The limiting amplifier above described is similar to that described in U. S. Patent No. 2,276,565, issued on March 17, 1942, to M. G. Crosby and further details concerning the same may be found therein.

The amplified signal $E_1$, appearing across the load impedance 172, is supplied to the bipolar detector 104 to produce the desired output signal. The detector shown is a so-called shunt type detector system and comprises a first diode element 174, having its anode connected to the anode 164 of tube section 158 through a capacitor 176, and a second diode element 178 having its cathode connected to the anode 164 through a capacitor 180. The cathode of diode 174 and the anode of diode 178 are connected to points at ground potential. The diodes supply a balanced load comprising resistors 182 and 184 connected in series, with the free end of resistor 182 connected to the anode of diode 174 and the free end of resistor 184 connected to the cathode of diode 178. A resistor 186 is connected between the junction of the resistors 182 and 184 and a point at ground potential. The bipolar detector so formed is made to operate as a peak detector by an appropriate selection of values of the resistors of 182 and 184 and produces, at the junction of the resistors, an output voltage having an amplitude and polarity as determined by the extent and direction of the excursion of the amplitude of the signal $E_1$, as previously explained in connection with the embodiment shown in Figure 2.

The output circuit of the phase comparator may include a low pass filter made up of a resistor 188, and two capacitors 190 and 192 as previously described in connection with Figure 2.

While the invention has been described with reference to the use of product demodulators of the multigrid illustrated, it will be readily apparent to those skilled in the art that other forms of product demodulators may be used. For example, the product demodulator may consist of a single triode operating under non-linear, i. e. square law, conditions. By applying both of the input carrier signals to the control grid of the triode, an output signal component $E_1=K_1 \cos \phi$ is produced at the anode. Alternatively, a single diode, operating under non-linear conditions and thereby effectively multiplying the input signals thereto, may be used. These latter types of product demodulators in general, have not proved as satisfactory as the product demodulators specifically described in Figures 2 and 3 because of the relatively small value of the signal $E_1$ produced thereby.

Furthermore, while bipolar detectors consisting of two diodes operating in opposite phase polarity have been specifically described, it is evident that other forms of bipolar detectors may equally be used.

While the invention has been described in its use in a color television system for comparing the phase relationship between two carrier signals, one of which is unmodulated and the other of which is modulated so as to be in the form of a burst signal, the phase comparator of the invention is also applicable for comparing the phase of two continuous carrier signals, both of which are unmodulated. Under such conditions, one of the carrier waves may be appropriately modulated, for example by gating the same as in the manner specifically shown in Figure 3.

While I have described my invention by means of specific examples and in specific embodiments, I do not wish to be limited thereto for obvious modifications will occur to those skilled in the art without departing from the spirit and scope of the invention.

What I claim is:

1. A phase comparator system comprising a source of a first signal having a carrier frequency of a given reference value, a source of a second signal having a carrier frequency approximating said given reference value, one of said signals being amplitude modulated by a modulating signal having an asymmetric waveform and having a frequency less than said carrier frequencies, a product demodulator system supplied with said first and second signals and responsive thereto to produce an output signal component having a frequency equal to the frequency of said modulating signal and having amplitude variations as determined by the phase displacement between said first and second signals, a bipolar detector system, means transmissive exclusively of alternating signal components coupling said detector system to the output of said product demodulator, and means for deriving from said bipolar detector system an output signal having amplitude variations as determined by the amplitude variations of said output signal component.

2. A phase comparator system as claimed in claim 1 wherein said source of an amplitude modulated signal comprises a source of a signal having a carrier frequency of given reference value and being in the form of bursts recurring at a frequency less than the said carrier frequency.

3. A phase comparator system as claimed in claim 1 wherein said product demodulator comprises a multi-grid electron discharge tube and said first and second signals are supplied to different grids of said tube.

4. A phase comparator system as claimed in claim 1 further comprising a signal amplifying system interposed between said product demodulator and said bipolar detector.

5. A phase comparator system as claimed in claim 4 wherein said amplifying system is a limiting amplifier.

6. A phase comparator system as claimed in claim 1 wherein said source of said amplitude modulated signal and said product demodulator comprises an electron discharge system having an electron path comprising two serially connected portions, means arranged in the first portion of said path for varying the intensity of electron flow in the first portion of said path at a rate equal to the carrier frequency of one of said signals, means for amplitude modulating said intensity varied electron flow at a frequency less than said carrier frequency, and means arranged in the second portion of said path for varying the intensity of the amplitude modulated electron flow at a rate equal to the carrier frequency of the other of said signals.

7. A phase comparator system as claimed in claim 6 wherein said electron discharge system comprises two electron discharge tubes each comprising a cathode, an anode and a control electrode, the anode of one of said tubes being connected to the cathode of the other, means for supplying a first carrier signal to a first of said control electrodes, means for supplying a modulating signal having a frequency less than the frequency of said carrier signal to said first of said control electrodes, and means for supplying a second carrier signal having a frequency substantially equal to the frequency of said first carrier signal to the second of said control electrodes.

8. A phase comparator system as claimed in claim 6 wherein said amplitude modulating signal is a pulsiform signal having positive and negative going amplitude excursions of different duration.

9. A phase comparator system comprising a source of a first signal having a carrier frequency of given reference value and recurring in the forms of bursts at a rate less than the carrier frequency of said signal, the time duration of said bursts being different from the interval between two successive bursts, a source of a second signal having a carrier frequency approximating said given reference value, a product demodulator supplied with said first and second signals and responsive thereto to produce a first signal component having a frequency equal to the repetition rate of said bursts, said first signal component having an amplitude as determined by the extent of the phase displacement between said first and second carrier signals and having an excursion polarity as determined by the direction of departure of the phase of said first carrier signal relative to the phase of said second carrier signal, said product demodulator additionally producing a second signal component establishing a reference level for said first signal component, a signal transmission path coupled to said product demodulator and selectively transmitting said first signal component to the exclusion of said second signal component, a bipolar detector sytem coupled to said transmission path and comprising a first signal channel responsive to positive going voltage excursions of said first signal component and a second signal channel responsive to negative going excursions of said first signal component, and means coupled to the outputs of said signal channels for producing an output signal having an amplitude and polarity as determined by the amplitude difference and the sense of the excursions of said first signal component applied to said bipolar detector system.

10. A phase comparator system as claimed in claim 9 wherein said product demodulator comprises an electron discharge device having two control grids and an anode, and comprising means for applying said first and second signals to different ones of said control grids, and wherein said bipolar detector comprises two diode elements arranged to be alternately conductive in synchronism with the positive and negative going excursions of said first component signal applied to said bipolar detector system.

11. A phase comparator system as claimed in claim 9 wherein said product demodulator further produces at the output thereof a third signal component having a frequency approximating the carrier frequencies of said first and second carrier signals, and further comprising attenuating means for said third component signal arranged in the transmission path between said product demodulator and said bipolar detector.

12. A phase comparator system comprising a source of a first signal having a carrier frequency of given reference value and recurring in the form of bursts at a frequency less than the carrier frequency of said signal, a source of a second signal having a carrier frequency approximating said given reference value, a product demodulator comprising an electron discharge system having two control electrodes and an output electrode, means for applying said signals to different ones of said control electrodes thereby to produce at said output electrode a first signal component having a frequency equal to the rate of said bursts, said first signal component having an amplitude as determined by the extent of the phase displacement between said first and second carrier signals and having an excursion polarity as determined by the direction of departure of the phase of said first carrier signal relative to the phase of said second carrier signal, a bipolar detector system capacitatively coupled to said output electrode, said bipolar detector system comprising two diode elements arranged to be alternately conductive in synchronism with positive and negative going excursions of said signal component, a load impedance interconnecting said diodes in differential arrangement, and means for deriving from said load impedance an output signal having an amplitude and polarity as determined by the extent and sense of the difference of the excursions of said signal component energizing said bipolar detector system.

13. A phase comparator system as claimed in claim 12 further comprising a signal limiting amplifying system interposed between the output electrode of said demodulator and said bipolar detector.

References Cited in the file of this patent

UNITED STATES PATENTS 2,668,189 Reddeck _______________ Feb. 2, 1954

UNITED STATES PATENT OFFICE

CERTIFICATE OF CORRECTION

Patent No. 2,793,347

May 21, 1957

Edward G. Clark

It is hereby certified that error appears in the printed specification of the above numbered patent requiring correction and that the said Letters Patent should read as corrected below.

Column 2, line 67, for "product" read -- produce --; column 3, line 7, for "single" read -- signal --; line 62, beginning with "color subcarrier" strike out all to and including "Figure 1 further", in line 65, and insert instead -- color subcarrier component. For this purpose the system of Figure 1 further --; column 5, line 56, after "in" insert -- the --; column 8, line 54, after "multigrid" insert -- type --.

Signed and sealed this 23rd day of December 1958.

(SEAL)

Attest:

KARL H. AXLINE
Attesting Officer

ROBERT C. WATSON
Commissioner of Patents